United States Patent
Outlaw

(10) Patent No.: US 7,039,983 B1
(45) Date of Patent: May 9, 2006

(54) GRILL BRUSH

(76) Inventor: Donald S. Outlaw, P.O. Box 36544, Birmingham, AL (US) 35236

( * ) Notice: Subject to any disclaimer, the term of this patent is extended or adjusted under 35 U.S.C. 154(b) by 0 days.

(21) Appl. No.: 10/313,984

(22) Filed: Dec. 6, 2002

(51) Int. Cl.
*A47L 17/06* (2006.01)
*A47L 13/02* (2006.01)

(52) U.S. Cl. .................. 15/111; 15/236.05; 15/236.06; 15/236.09

(58) Field of Classification Search .................. 15/111, 15/143.1, 176.4, 236.05, 236.06–236.09, 15/236.01; 30/172, 173; D32/46

See application file for complete search history.

(56) References Cited

U.S. PATENT DOCUMENTS 2,824,323 A * 2/1958 Tos et al. ...................... 15/105
5,373,600 A * 12/1994 Stojanovski et al. .......... 15/111
6,601,263 B1 * 8/2003 Lam ........................ 15/236.09
2003/0135946 A1 * 7/2003 MacLean ................... 15/176.4

* cited by examiner

*Primary Examiner*—Richard Crispino
*Assistant Examiner*—Shay Balsis
(74) *Attorney, Agent, or Firm*—Robert M. Jackson; Patent & Enviromental Law Ctr

(57) ABSTRACT

A grill brush assembly comprising an elongated handle portion, a head portion integral the head portion and extending from a forward end thereof constructed of rigid material such as but not limited to wood or molded polymeric material. The invention includes a plurality of bristles extending downward from the lower surface of the head portion, and a grill scraper fixedly attached to the forward edge of the head portion by suitable attachment means. The scraper of the present invention has an upper edge for scraping the uppermost surface of a series of grates, and an opposing pair of hook-like extension portions extending from opposite sides of the scraper. Each extension portion forms a pair of scraping faces for simultaneously engaging an uppermost surface of a single grill grate and the lowermost surface of an adjacent single grate. With a simple twist of the wrist an extension portion wraps around adjacent grill grates to easily and thoroughly clean all surfaces of the grates, top, bottom, and sides, with minimal strokes and without having to reposition the grill grate assembly.

8 Claims, 5 Drawing Sheets

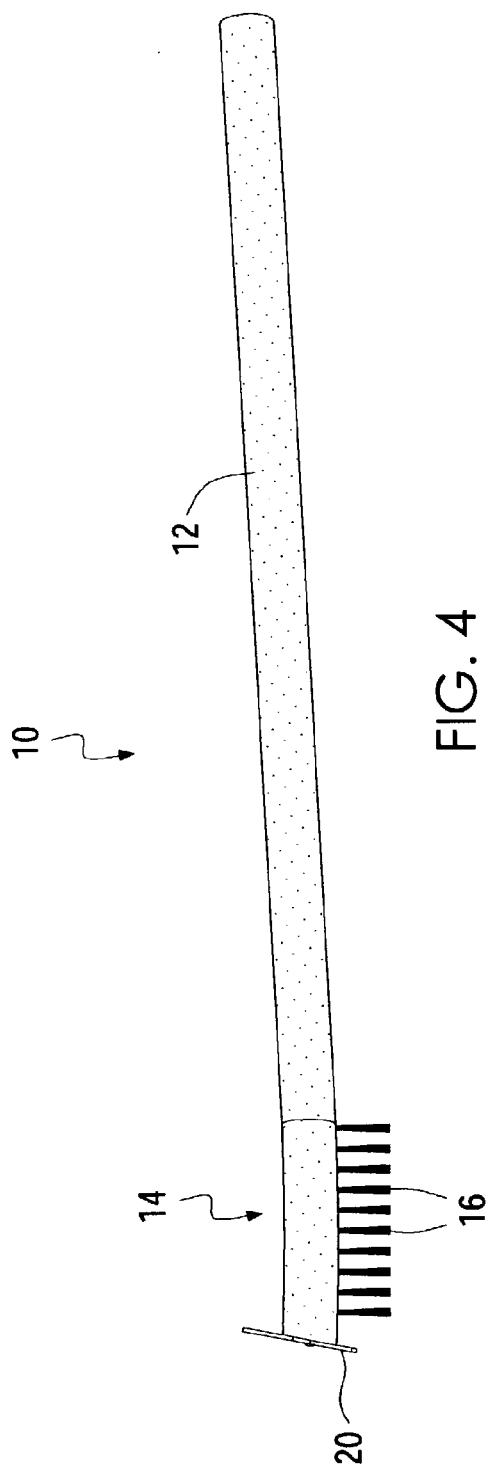
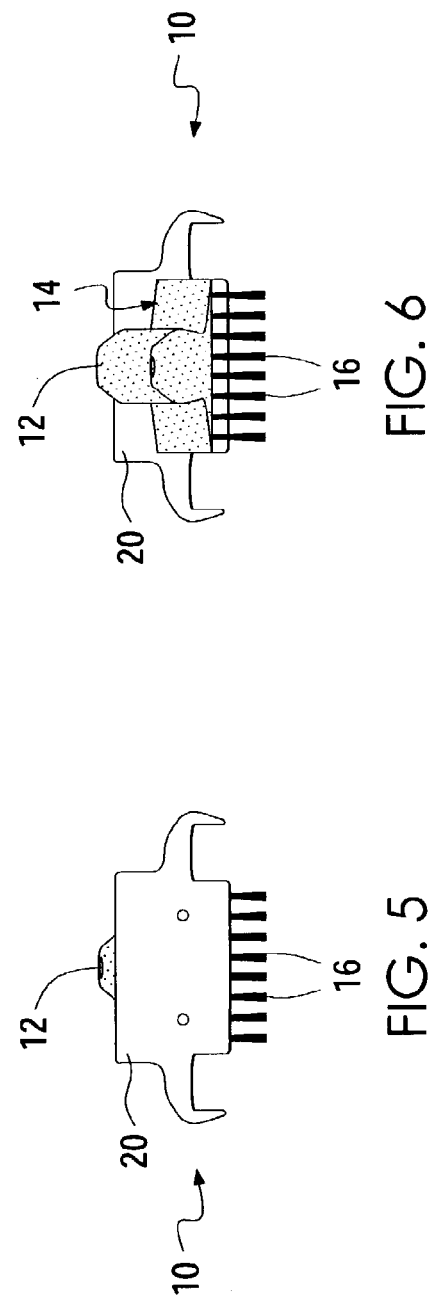

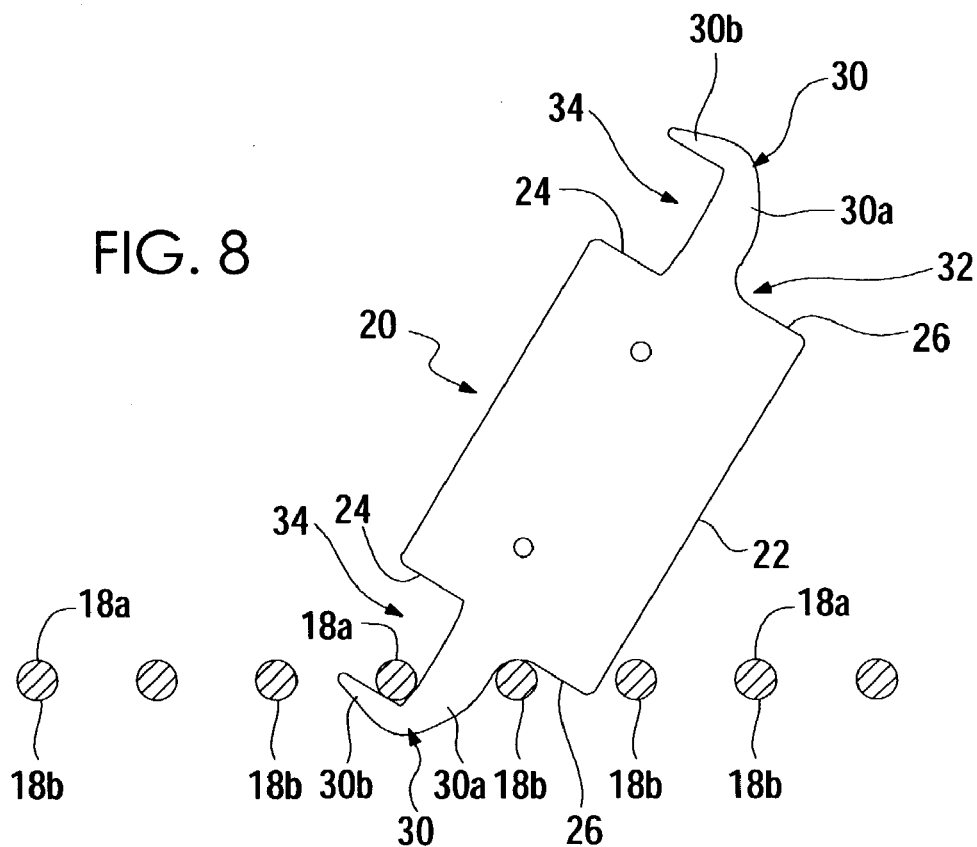
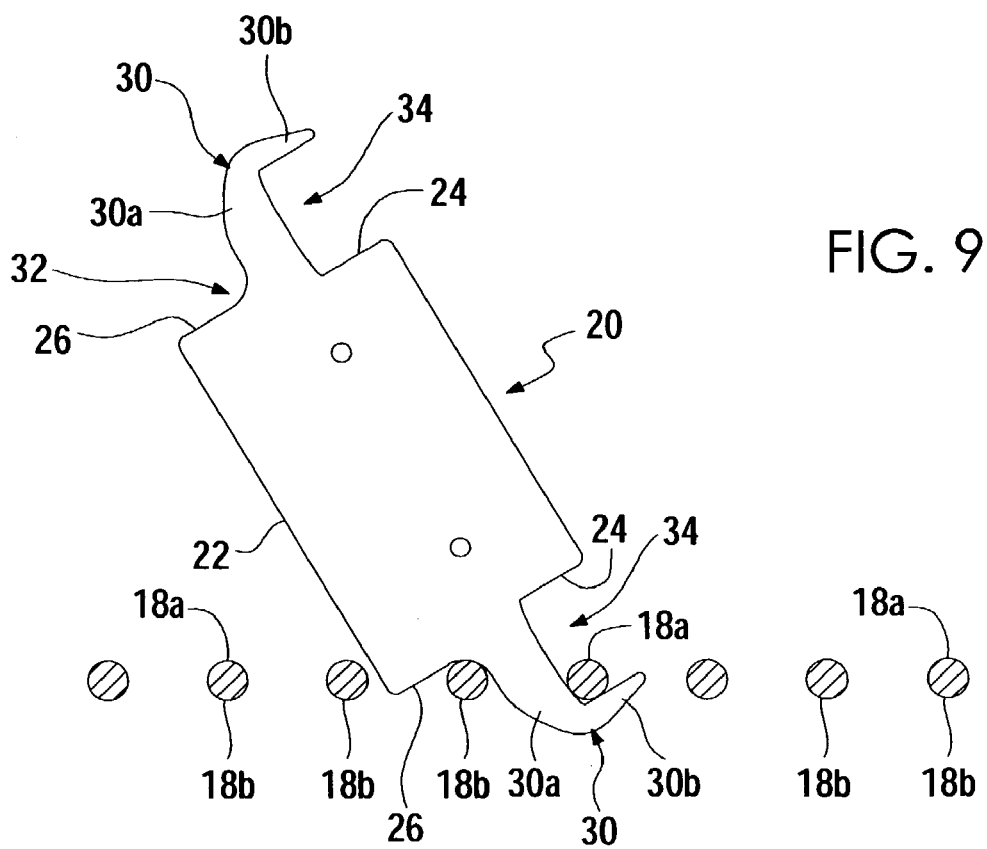

US 7,039,983 B1

GRILL BRUSH

FIELD OF THE INVENTION

The present invention relates to a grill brush. With greater particularity, the present invention relates to a grill brush having a scraper with a pair of opposing extension portions that form two scraping faces for simultaneously cleaning the lowermost and uppermost surfaces of adjacent grates of a barbecue grill.

BACKGROUND OF THE INVENTION

There has long been a need for a cleaning implement for the grate assembly of a barbecue grill that provides efficient and thorough cleaning of the grill grate. Conventional methods and cleaning implements are difficult and messy to use. More important, conventional grill cleaning implements do not provide a simple method of thoroughly cleaning grill grates, and therefore do not eliminate the risk of contamination from poorly cleaned grates. Further, conventional methods expose the user to unacceptable safety risks associated with exposure to chemicals traditionally used to clean grill grates and with handling of hot grill grate assemblies, which can result in burns.

Conventional grill tools such as grill brushes and scrapers have not been designed to efficiently clean grill grates on the bottom and side surfaces of the grate. Such conventional cleaning implements are primarily utilized to only brush or scrape the top surface of the grate assembly. Typically, cleaning the bottom surface of the grates requires cumbersome techniques such as manually lifting the grill grate assembly and flipping it over to expose its bottom surface, and then manually scraping and brushing the exposed bottom surface. Heretofore, thorough cleaning of grill grates has been accomplished primarily with the use of costly disposable brillo-type cleaning pads applied to the grates after the grill grates completely cooled after use. At a minimum, such conventional cleaning methods are messy procedures that require a significant amount of cleaning space. Further, conventional cleaning methods are awkward and can result in grill burns to a user attempting to clean the grill grates before they have completely cooled after use.

From the foregoing it may be seen that heretofore, no one has adequately provided a grill brush assembly that thoroughly cleans all surfaces of grill grates, top, bottom, and sides. A need exists for a grill brush assembly that provides an easy method of cleaning the surfaces of grill grates that overcomes the limitations of prior art grill cleaning implements, thereby encouraging the maintenance of grill grates in clean and sanitary conditions.

SUMMARY OF THE PRESENT INVENTION

It is an object of the present invention to provide an improved cleaning implement for the grates of a barbecue grill.

Another object of the present invention is to provide a cleaning implement that efficiently and simultaneously cleans adjacent grates of a barbecue grill.

An additional object of the present invention is to provide a cleaning implement that cleans all surfaces of grill grates, top, bottom, and sides.

A still further object of the present invention is to provide a cleaning implement that may be safely utilized to clean all surfaces of grates of a barbecue grill grate assembly before the grates have completely cooled after use and without having to manually reposition the grill grate assembly.

An additional object of the present invention is to provide a cleaning implement for the grates of a grill that thoroughly clean the grates without having to utilize cleaning chemicals or messy cleaning techniques.

Another object of the present invention is to provide a grill brush having a scraper with a pair of opposing extension portions that form two scraping faces for simultaneously cleaning the lowermost and uppermost surfaces of adjacent grates of a barbecue grill These and other objects of the present invention are accomplished through the use of a grill brush assembly that comprises an elongated handle portion, a head portion integral the handle portion and extending from a forward end thereof constructed of rigid material such as but not limited to wood or molded polymeric material. The invention includes a plurality of bristles extending downward from the lower surface of the head portion, and a grill scraper fixedly attached to the forward edge of the head portion by suitable attachment means. The grill brushes and grill scraper are comprised of materials suitable for brushing or scraping debris from all surfaces of grill grates, top, bottom, and sides.

The scraper of the present invention has an upper edge for scraping the uppermost surface of a series of parallel grates, and an opposing pair of hook-like extension portions extending from opposite sides of the scraper. Each extension portion forms a pair of scraping faces for simultaneously engaging an uppermost surface of a single grill grate and the lowermost surface of an adjacent single grate in a parallel series of grates. With a simple twist of the wrist an extension portion wraps around adjacent grill grates to easily and thoroughly clean the top, bottom, and side surfaces of the grates with minimal cleaning strokes and without having to reposition the grill grate assembly.

In this manner, the present invention provides a cleaning method that may be utilized shortly after using the grill, before it has completely cooled, to eliminate the buildup of dried greases, sauces, and meat particulates that can cause unsanitary cooking conditions and flame flare ups on the grill during subsequent use. The present invention is thus an improvement over conventional cleaning implements that do not effectively reach the sides and bottoms surfaces of grill grates. The present invention makes it easier to maintain the grill grates in a clean and sanitary condition intermediate use, reducing the attractiveness of the grill grate to potentially disease-spreading pests such as insects and rodents. The present invention, by allowing all surfaces of grill grate assemblies, top, bottom, and sides, to be thoroughly cleaned on a regular basis, thereby extends the useful life of the grill grate assembly.

The extension portions of the present invention are generally hook-shaped members that comprise a first leg extending at a proximal end from one of the opposing sides of the scraper, and a second leg extending from a distal end of the first leg and terminating in a rounded point. The first leg of each pair of extension portions has a lower edge that connects with a lower edge of the scraper to form a first scraping face adapted for engagement with an uppermost surface of an elongated grate. The first leg of each pair of extension portions also has an upper edge that connects with the inner edge of the second leg to form a generally orthogonal second scraping face adapted for engagement with a lowermost surface of an adjacent elongated grate.

The present invention is adapted for simultaneously engaging the uppermost surface of a grill grate with a first scraping face and the lowermost surface of an adjacent grill grate with a second scraping face. The present invention may be utilized to clean the uppermost and lowermost surfaces of two adjacent grill grates by engaging one extension portion during cleaning strokes along adjacent grill grates and then reorienting the scraper to engage the same adjacent grates with the opposing extension portion positioned on the opposite side of the scraper. Thus, the present invention allows for thoroughly cleaning adjacent grill grates by simply reorienting the extension portion of the scraper engaging the grates between scraping strokes. Additional coverage of grate surfaces as well as additional leverage in applying scraping force may also be provided by reorienting the longitudinal axis of the grill handle between scraping strokes.

The present invention also provides a scraper mounted at an inclined angle with respect to the longitudinal axis of the handle portion. This provides a stronger mount position of the scraper blade with respect to the handle portion and allows for application of greater leverage on the scraper during cleaning strokes, as well as improved scraping angles. The grill brushes provided in the present invention allow a user to supplement the cleaning method of scraping with brushing, which further provides for greater cleaning efficiency. The hook-like extension portions may also be utilized as a safe mechanism to lift a hot or dirty grill grate assembly.

These and other objects and advantages of the invention will become apparent from the following detailed description of the preferred embodiment of the invention.

BRIEF DESCRIPTION OF THE DRAWINGS

A grill brush assembly embodying the features of the present invention is depicted in the accompanying drawings which form a portion of this disclosure and wherein:

FIG. 4 is a left side elevational view of the preferred embodiment of an grill brush assembly, the right side elevational view being a mirror image thereof FIG. 5 front elevational view of the preferred embodiment of an grill brush assembly;

FIG. 6 is a rear elevational view of the preferred embodiment of an grill brush assembly;

FIG. 8 is a front elevational view of a right side extension portion of a scraper engaging adjacent grates of a barbecue grill; and FIG. 9 is a front elevational view of a left side extension portion of a scraper engaging adjacent grates of a barbecue grill.

DESCRIPTION OF THE PREFERRED EMBODIMENT

Figure 1:
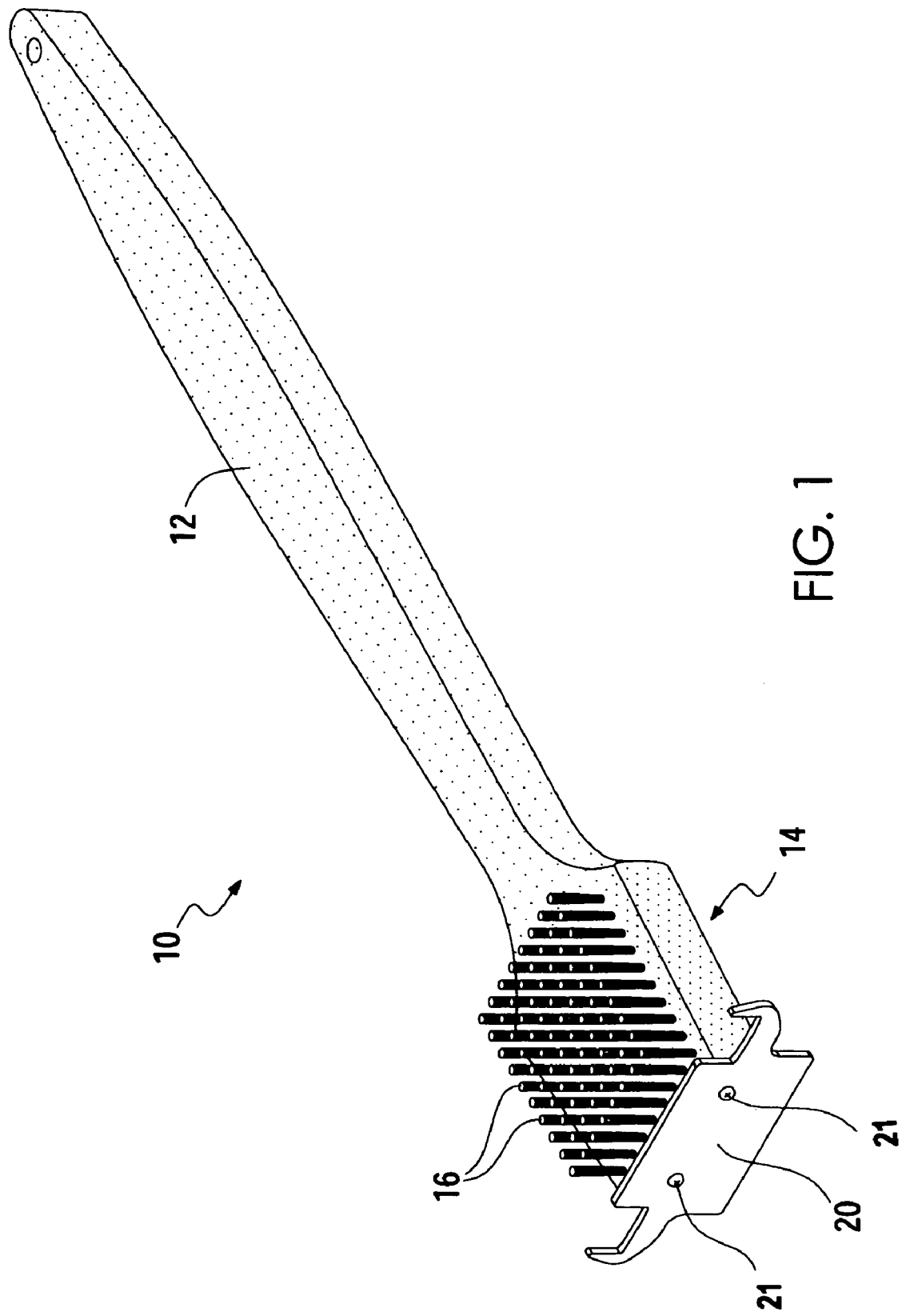
FIG. 1 is a perspective view of the preferred embodiment of a grill brush assembly.
Figure 2:
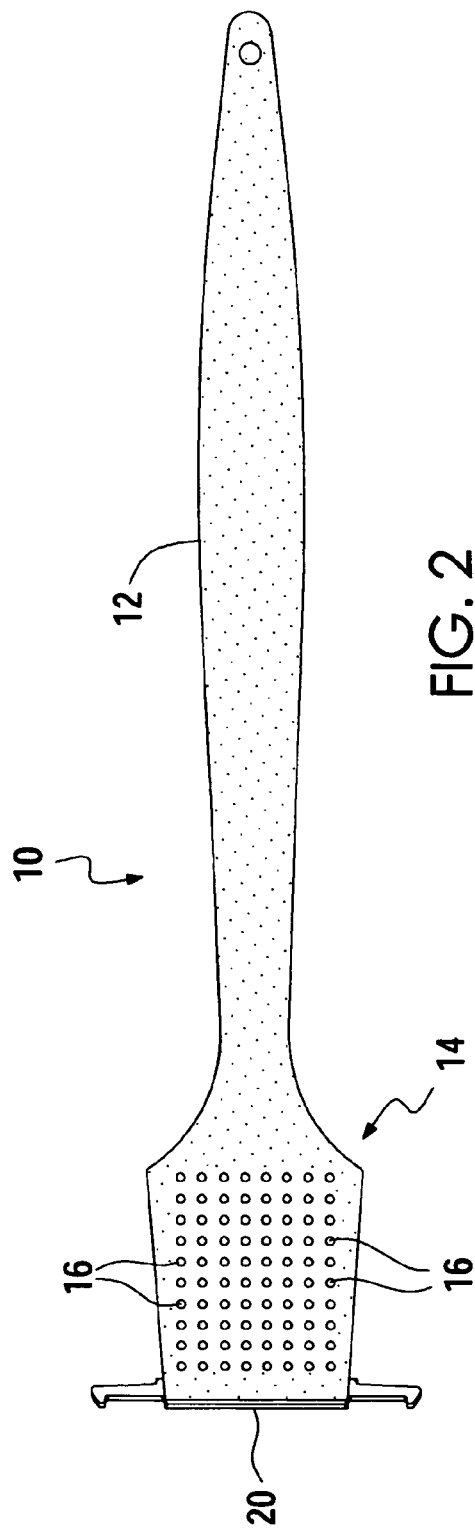
FIG. 2 is a bottom plan view of the preferred embodiment of an grill brush assembly
Figure 3:
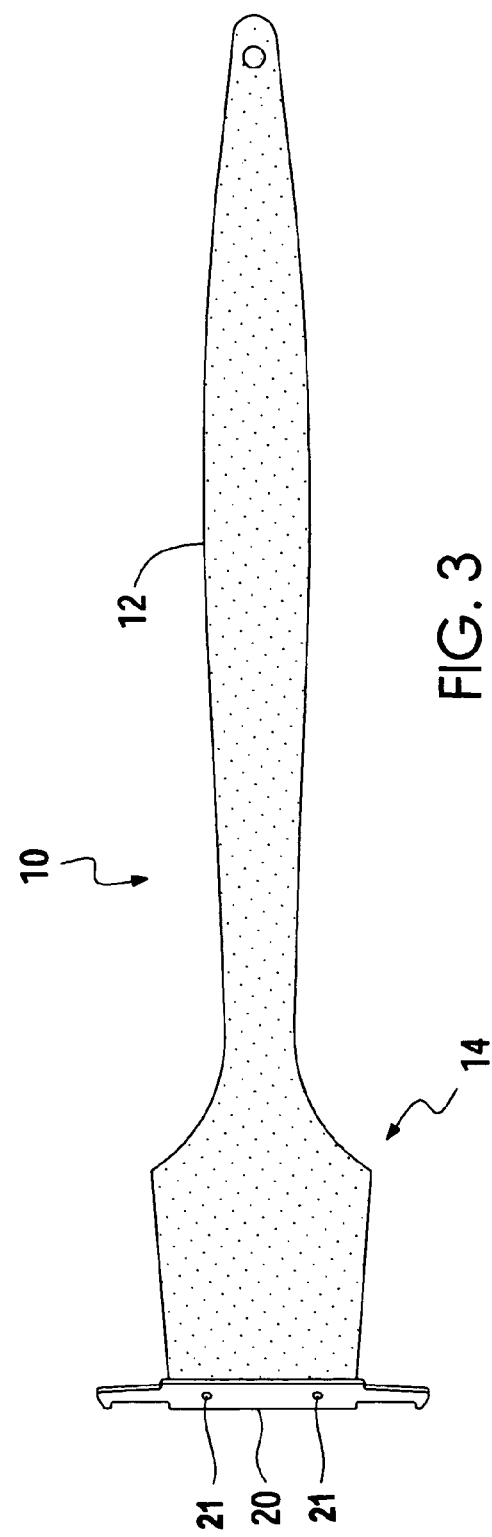
FIG. 3 is a top plan view of the preferred embodiment of an grill brush assembly.

Referring to FIGS. 1–9 for a clearer understanding of the invention, it may be seen that the preferred embodiment of the grill brush assembly 10 for use in cleaning debris from the grates 18 of a grill (not shown). The present invention comprises an elongated handle portion 12 and a head portion 14 integral the handle portion 12 and extending from a forward end thereof. The handle portion 12 and head portion 14 have upper and lower surfaces, and the distal end of the head portion terminates in an inclined forward edge having a planer surface. The handle portion 12 and head portion 14 are constructed of a rigid material such as wood or molded plastic. The invention includes a plurality of bristles 16 extending downward from the lower surface of the head portion 14, as shown in FIG. 4. The bristles 16 are likewise comprised of suitable material for scrubbing debris from the grates 18 of a grill.

The present invention further provides a grill scraper 20 mounted to the forward edge of the head portion 14 by suitable attachment means such as threaded fasteners (not shown) extending through apertures 21 formed in the center portion of the scraper 20 and into the head portion 14 of the grill brush assembly 10. In the preferred embodiment, the scraper 20 is a metal plate comprised of stainless steel, but it is contemplated that the scraper 20 may be comprised of other materials suitable for scraping debris from the grates 18 of a grill.

The scraper 20 has an upper edge 22 for scraping the uppermost surface of a series of grates 18, the uppermost surface being shown as 18a in FIGS. 8 and 9. Extending from the sides of the scraper 20 are opposing extension portions 30 forming a pair of scraping faces 32, 34 for simultaneously engaging an uppermost surface 18a of a first elongated grill grate and the lowermost surface 18b of an adjacent elongated grate positioned parallel to the first grill grate. The extension portions 30 are generally hook-shaped members that comprise a first leg 30a extending at a proximal end thereof from one of the opposing sides of the scraper 20, and a second leg 30b extending from the distal end of the first leg 30a, the second leg 30b having a distal end terminating in a rounded point. The first leg 30a of each pair of extension portions 30 has a lower edge that connects with a lower side edge 26 of the scraper to form a rounded first scraping face 32 adapted for engagement with an uppermost surface 18a of a grate. The first leg 30a of each pair of extension portions 30 has an upper edge the connects with the inner edge of the second leg 30b to form a generally orthogonal second scraping face 34 adapted for engagement with a lowermost surface 18b of a grate.

Although the preferred embodiment discloses a first scraping face 32 having a generally rounded configuration and a second scraping face 34 facing having a generally orthogonal scraping face, it is contemplated that the scraping faces of the present invention may comprise recesses having rounded, orthogonal, or other configurations without departing from the scope of the present invention. For instance, although the drawings disclose the use of the present invention with elongated grill grates 18 having cylindrical cross sections, this is not intended to limit the scope of the disclosure. It is contemplated that the present invention have recesses of different configurations to provide scraping faces that may be utilized with grates having different cross-sectional configurations, such as of a square or rectangular type. The preferred embodiment further discloses a scraper 20 having opposing upper side edges 24 having a longitudinal axis that is offset from the longitudinal axis defined by an adjacent lower side edge 26, however, the present invention may alternate side configurations without departing from the scope of the present invention.

Figure 7:
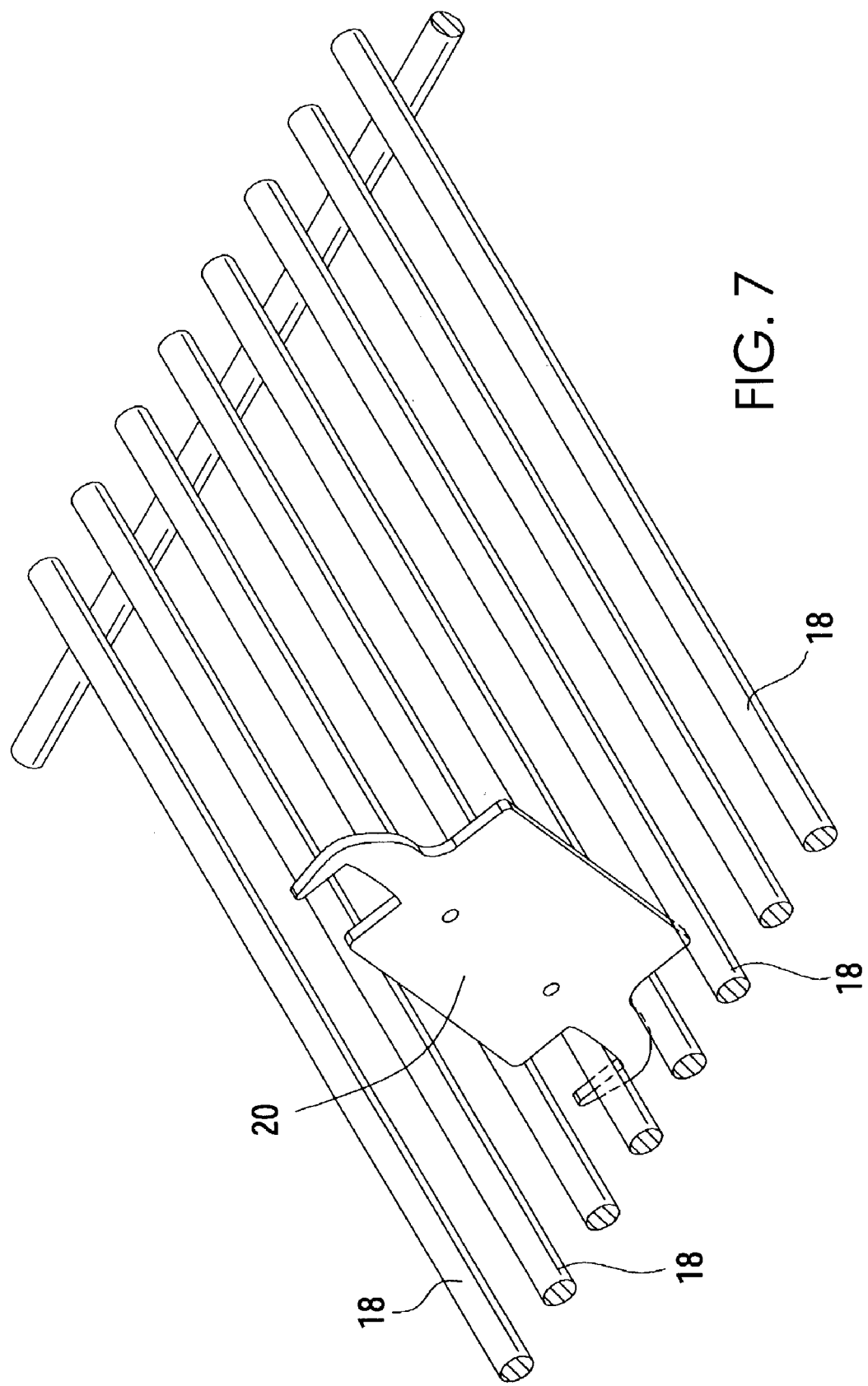
FIG. 7 is a perspective view of a scraper of the present invention engaging adjacent grates of a barbecue grill.

As shown in perspective view in FIG. 7, and along a front sectional view in FIGS. 8 and 9, the scraper 20 of the present invention is adapted for simultaneously engaging the uppermost surface 18a of a grill grate with a first scraping face 32 and the lowermost surface 18b of an adjacent grill grate with a second scraping face 34. As shown in FIGS. 8 and 9, the present invention may be utilized to clean the uppermost 18a and lowermost surfaces 18b of two adjacent, elongated parallel grill grates by engaging a right side extension portion as shown in FIG. 8 and then reorienting the scraper 20 to engage the same adjacent grates 18 with a left side extension portion as shown in FIG. 9. It can be appreciated that the present invention allows for cleaning the entire surface of grill grates 18 by simply reorienting the extension portion of the scraper 20 engaging the grates 18 between scraping strokes. Additional coverage of grate surfaces as well as additional leverage in applying scraping force may additionally be provided by reorienting the longitudinal axis of the grill handle 12 between scraping strokes. The preferred embodiment of the present invention 10 provides a scraper 20 mounted at an inclined angle with respect to the longitudinal axis of the handle portion 14 to provide greater leverage to cleaning strokes. It is contemplated that the scraper 20 of the present invention may be attached at other orientations relative to the head portion 14 without departing from the present invention.

It is to be understood that the form of the invention shown is a preferred embodiment thereof and that various changes and modifications may be made therein without departing from the spirit of the invention or scope as defined in the following claims.

What is claimed is:

1. A grill cleaning assembly for cleaning debris from adjacent elongated grates of a barbecue grill comprising, an elongated handle portion having a longitudinal axis and a forward end, a head portion extending from said forward end, said head portion having a forward edge, an upper surface and a lower surface, a scraper mounted on said forward edge, said scraper having opposing sides and a pair of opposing hook-shaped extension portions extending from said sides, each said extension portion forming a pair of scraping faces for simultaneously engaging said adjacent grates of a grill, wherein said scraper is mounted at an inclined angle with respect to the longitudinal axis of the handle portion.

2. A grill cleaning assembly as described in claim 1 wherein each said extension portion comprises a first leg extending outwardly at its proximal end from one of said opposing sides of said scraper and a second leg extending upwardly from a distal end of said first leg.

3. A grill cleaning assembly as described in claim 2 wherein said scraper has opposing lower side edges, and each of said first legs has a lower edge that connects with one of said lower side edges to form a first scraping face adapted for engagement with an uppermost surface of a first grate; and each of said first legs has an upper edge that connects with an inner edge of a second leg to form a second scraping face adapted for engagement with a lowermost surface of an adjacent grate.

4. A grill cleaning assembly as described in claim 1 wherein said scraper is a metal plate comprised of stainless steel.

5. A grill cleaning assembly as described in claim 1 further comprising plurality of bristles extending from said lower surface of said head portion.

6. A grill cleaning assembly for cleaning debris from adjacent elongated grates of a barbecue grill comprising, an elongated handle portion having a longitudinal axis and a forward end, a head portion extending from said forward end, said head portion having a forward edge, a scraper mounted on said forward edge, said scraper having opposing sides and a pair of opposing hook-shaped extension portions having a first leg extending outwardly at its proximal end from one of said opposing sides and a second leg extending upwardly from a distal end of said first leg, wherein each of said first legs has a lower edge that connects with one of said sides to form a first scraping face adapted for engagement with an uppermost surface of a first grate; and each of said first legs has an upper edge that connects with an inner edge of a second leg to form a second scraping face adapted for engagement with a lowermost surface of an adjacent grate.

7. A grill cleaning assembly as described in claim 6 wherein said scraper is a metal plate comprised of stainless steel.

8. A grill cleaning assembly as described in claim 6 further comprising a plurality of bristles extending from a lower surface of said head portion.

* * * * *